(12) United States Patent
Derr et al.

(10) Patent No.: US 12,418,349 B2
(45) Date of Patent: Sep. 16, 2025

(54) SPECTRUM MONITORING AND ANALYSIS, AND RELATED METHODS, SYSTEMS, AND DEVICES

(71) Applicants: Battelle Energy Alliance, LLC, Idaho Falls, ID (US); University of Utah Research Foundation, Salt Lake City, UT (US); Dawn Ramirez, Shelley, ID (US)

(72) Inventors: Kurt W. Derr, Idaho Falls, ID (US); Samuel Ramirez, Shelley, ID (US); Sneha K. Kasera, Salt Lake City, UT (US); Christopher D. Becker, Aitkin, MN (US); Aniqua Z. Baset, Salt Lake City, UT (US)

(73) Assignees: Battelle Energy Alliance, LLC, Idaho Falls, ID (US); University of Utah Research Foundation, Salt Lake City, UT (US)

( * ) Notice: Subject to any disclaimer, the term of this patent is extended or adjusted under 35 U.S.C. 154(b) by 677 days.

(21) Appl. No.: 17/056,359

(22) PCT Filed: May 17, 2019

(86) PCT No.: PCT/US2019/032845
§ 371 (c)(1),
(2) Date: Nov. 17, 2020

(87) PCT Pub. No.: WO2020/068176
PCT Pub. Date: Apr. 2, 2020

(65) Prior Publication Data
US 2021/0211212 A1    Jul. 8, 2021

Related U.S. Application Data

(60) Provisional application No. 62/800,251, filed on Feb. 1, 2019, provisional application No. 62/673,545, filed on May 18, 2018.

(51) Int. Cl.
*H04B 17/336* (2015.01)
*H04B 17/15* (2015.01)
(Continued)

(52) U.S. Cl.
CPC .......... *H04B 17/336* (2015.01); *H04B 17/15* (2015.01); *H04B 17/29* (2015.01); *H04W 24/08* (2013.01);
(Continued)

(58) Field of Classification Search
CPC ...... H04B 17/336; H04B 17/15; H04B 17/29; H04W 24/08; H04W 24/10; H04W 24/0958
See application file for complete search history.

(56) References Cited

U.S. PATENT DOCUMENTS

| 6,175,634 B1 | 1/2001 | Graumann |
| 7,680,502 B2 | 3/2010 | McCown et al. |

(Continued)

FOREIGN PATENT DOCUMENTS

WO    2018/0170267 A1    9/2018

OTHER PUBLICATIONS

International Search Report for Application No. PCT/US2019/032845, mailed Apr. 21, 2020, 5 pages.
(Continued)

*Primary Examiner* — Redentor Pasia
(74) *Attorney, Agent, or Firm* — TraskBritt

(57) ABSTRACT

Disclosed embodiments relate to ensemble wireless signal classification and systems and devices the incorporate the same. Some embodiments of ensemble wireless signal classification may include energy-based classification processes and machine learning-based classification processes. In some embodiments, incremental machine learning tech-
(Continued)

niques may be incorporated to add new machine learning-based classifiers to a system or update existing machine learning-based classifiers.

10 Claims, 11 Drawing Sheets

(51) Int. Cl.
  *H04B 17/29* (2015.01)
  *H04W 24/08* (2009.01)
  *H04W 24/10* (2009.01)
  *H04W 28/08* (2023.01)

(52) U.S. Cl.
  CPC ....... *H04W 24/10* (2013.01); *H04W 28/0958* (2020.05)

(56) References Cited

U.S. PATENT DOCUMENTS

| | | | | |
|---|---|---|---|---|
| 8,160,163 | B1* | 4/2012 | Yucek | H04L 27/0006 375/349 |
| 8,494,464 | B1* | 7/2013 | Kadambe | H04K 3/45 455/67.11 |
| 8,938,202 | B1 | 1/2015 | Thommana et al. | |
| 8,958,764 | B1 | 2/2015 | Xu et al. | |
| 9,195,934 | B1 | 11/2015 | Hunt et al. | |
| 10,372,587 | B1 | 8/2019 | Sternberg et al. | |
| 10,429,486 | B1* | 10/2019 | O'Shea | H04B 1/0003 |
| 2008/0293353 | A1* | 11/2008 | Mody | H04K 3/45 455/1 |
| 2009/0047920 | A1 | 2/2009 | Livsics et al. | |
| 2009/0154291 | A1 | 6/2009 | Ferber | |
| 2009/0253376 | A1* | 10/2009 | Parssinen | H04W 72/02 455/62 |
| 2010/0124940 | A1* | 5/2010 | Hassan | H04W 16/14 455/509 |
| 2010/0266002 | A1 | 10/2010 | Du et al. | |
| 2012/0263247 | A1 | 10/2012 | Bhattad et al. | |
| 2013/0281108 | A1* | 10/2013 | Silva | H04W 72/541 455/452.2 |
| 2013/0288734 | A1* | 10/2013 | Mody | H04K 3/45 455/509 |
| 2013/0297299 | A1 | 11/2013 | Chakrabartty et al. | |
| 2013/0336425 | A1* | 12/2013 | Lee | H04L 27/02 375/303 |
| 2014/0106801 | A1 | 4/2014 | Tamizhmani et al. | |
| 2015/0071129 | A1 | 3/2015 | Soderlund et al. | |
| 2015/0087347 | A1 | 3/2015 | Roberts et al. | |
| 2015/0256234 | A1* | 9/2015 | Bose | H04W 16/14 370/329 |
| 2015/0289143 | A1* | 10/2015 | McHenry | H04W 64/006 455/67.13 |
| 2017/0014794 | A1 | 1/2017 | Seul | |
| 2017/0094527 | A1* | 3/2017 | Shattil | H04K 3/45 |
| 2017/0147940 | A1* | 5/2017 | Mitola, III | G06N 20/00 |
| 2018/0324595 | A1* | 11/2018 | Shima | H04B 7/0413 |
| 2019/0066713 | A1* | 2/2019 | Mesgarani | H04R 25/507 |
| 2019/0122689 | A1* | 4/2019 | Jain | H04R 1/406 |
| 2019/0318725 | A1* | 10/2019 | Le Roux | G10L 15/16 |

OTHER PUBLICATIONS

Written Opinion of the International Searching Authority for Application No. PCT/US2019/032845, mailed Apr. 21, 2020, 10 pages.
Hong et al., "DOF: A Local Wireless Information Plane", ACM SIGCOMM Computer Communication Review—SIGCOMM '11, vol. 41 Issue 4, (Aug. 2011) pp. 230-241.
Lakshminarayanan et al., "RFDump: An Architecture for Monitoring the Wireless Ether", Proceedings of the 5th international conference on Emerging networking experiments and technologies, Rome, Italy (Dec. 2009) pp. 253-264.
Li, "Mixed Signal Detection and Parameter Estimation based on Second-Order Cyclostationary Features", A thesis submitted in partial fulfillment of the requirements for the degree of Masters of Science in Engineering, Wright State University (Dec. 2019) 49 pages.
Yadav et al., "Hybrid Cooperative Spectrum Sensing with Cyclostationary Detection for Cognitive Radio Networks", 2016, IEEE, (Year: 2016).

\* cited by examiner

SPECTRUM MONITORING AND ANALYSIS, AND RELATED METHODS, SYSTEMS, AND DEVICES

CROSS-REFERENCE TO RELATED APPLICATIONS

This application is a national phase entry under 35 U.S.C. § 371 of International Patent Application PCT/US2019/032845, filed May 17, 2019, designating the United States of America and published in English as International Patent Publication WO2020/068176 A1 on Feb. 4, 2020, which claims the benefit under Article 8 of the Patent Cooperation Treaty to U.S. Provisional Patent Application Ser. No. 62/673,545, filed May 18, 2018, for "Spectrum Monitoring and Analysis, and Related Methods, Systems, and Devices," and the benefit of the filing date of U.S. Provisional Patent Application Ser. No. 62/800,251, filed Feb. 1, 2019 for "Wireless Environment Monitoring, and Related Methods, Systems, and Devices," the entire contents and disclosure of both of which are hereby incorporated herein by this reference.

STATEMENT REGARDING FEDERALLY SPONSORED RESEARCH OR DEVELOPMENT

The invention was made with government support under Contract No. DE-AC07-05-ID14517, awarded by the United States Department of Energy. The government has certain rights in this invention.

TECHNICAL FIELD

Embodiments of the present disclosure relate, generally, to identifying wireless signals and protocols, and more particularly, some embodiments relate to protocol reverse engineering of wireless signals.

BACKGROUND

Wireless communications technology is becoming ubiquitous throughout society. Although Wi-Fi has grown to be the ubiquitous Internet access technology, many other wireless protocols are used, for example, wireless communication systems such as Bluetooth, Bluetooth Low Energy, Wi-Fi, cellular, Apple iBeacon, Z-Wave, and ZigBee. Wireless communications devices are widely used in residential homes, as well as in public safety, emergency response, and critical infrastructure applications.

Shared spectrum is a model for efficient usage of the wireless spectrum given an ever expanding telecommunication industry and an expanding wireless revolution fueled by emerging infrastructures like IoT (internet of things), autonomous cars, and smart medical devices. For example, the spectrum access system (SAS) model for 3.5 GHz band is intended for naval radars. According to the SAS model, the incumbent users (e.g., naval radars) are guaranteed to have a highest priority and interference-free access of the band while priority access license (PAL) users (e.g., mobile service providers) have prioritized access of the band when incumbents are absent. The band can also be used by generalized authorized access (GAA) (e.g., Wi-Fi) users for whom no priority and interference-free environment is guaranteed.

The inventors of this disclosure foresee a need for efficient techniques and tools for detecting and classifying wireless signals that are useable across a variety of transmission environments. Moreover, the inventors of this disclosure foresee a need for efficient mechanisms and protocols for detecting the presence of incumbent transmitters, channel allocation among PAL users, and spectrum usage enforcement among PALs and GAAs with the tiered access.

Wireless communications technology is becoming ubiquitous throughout society. Although Wi-Fi has grown to be the ubiquitous Internet access technology, many other wireless protocols are used, for example, wireless communication systems such as Bluetooth, Bluetooth Low Energy, Wi-Fi, cellular, Apple iBeacon, Z-Wave, and ZigBee. Wireless communications devices are widely used in residential homes, as well as in public safety, emergency response, and critical infrastructure applications.

Understanding the surrounding wireless/radio-frequency (RF) environment is a long coveted ability. Early it was for military and defense applications, but with the tremendous increase in the use of wireless devices, the ability to understand wireless environments is becoming a necessity. For example, wireless devices are increasingly being used in modern industrial facilities for automation, monitoring and control of equipment, inventory tracking, and more. There is a growing need for continuous monitoring of wireless signals to identify anomalous wireless usage in industrial facilities, power substations, and nuclear plants, to name a few needs, where, for example, a personal device or external device may interfere with and/or disrupt a wireless system and even lead to hazardous results.

The inventors of this disclosure foresee a need for systems for monitoring wireless environments, and detecting and classifying wireless signals that are useable across a variety of wireless environments. Moreover, the inventors of this disclosure foresee a need for systems for monitoring wireless environments that are robust and flexible enough to adapt to changes in a wireless environment, especially changes that occur in critical infrastructure.

Moreover, the inventors of this disclosure foresee a need for monitoring systems that may be deployed quickly into a variety of wireless environments, and that automatically tune to a wireless environment.

BRIEF DESCRIPTION OF FIGURES

To easily identify the discussion of any particular element or act, the most significant digit or digits in a reference number refer to the figure number in which that element is first introduced.

DETAILED DESCRIPTION

Figure 1:
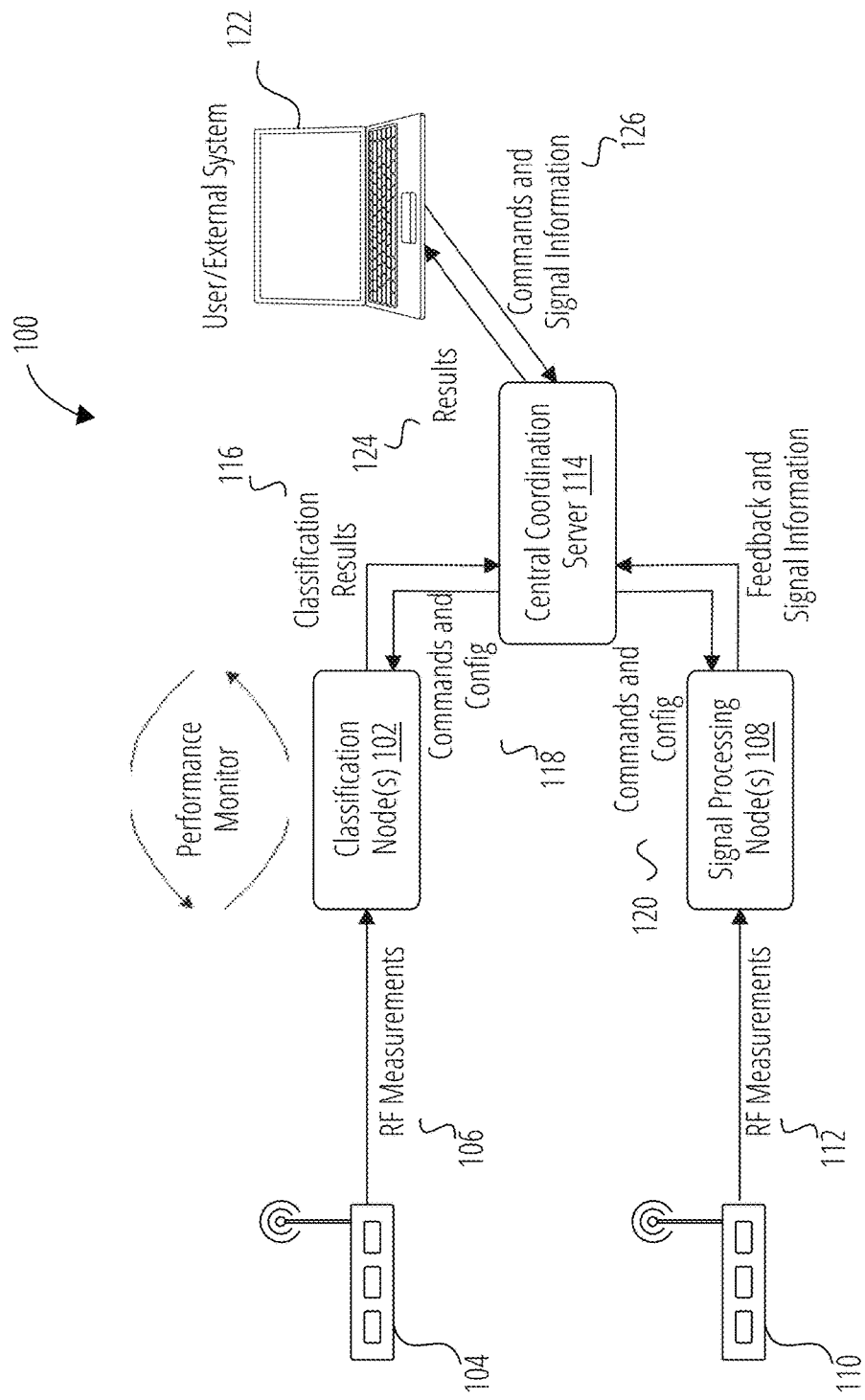
FIG. 1 illustrates a system for real-time spectrum monitoring and analyzing in accordance with one or more embodiments.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, and symbols that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

The various illustrative logical blocks, modules, engines, and circuits described in connection with the embodiments disclosed herein may be implemented or performed with a general purpose processor, a special purpose processor, a Digital Signal Processor (DSP), an Application Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

FIG. 1 shows a block diagram of a system 100 for real-time spectrum monitoring and analyzing, in accordance with disclosed embodiments. In various embodiments, system 100 may be a stand-alone system or a sub-system of another system.

System 100 may include a central coordination server 114 operable to communicate with a set of classification nodes 102 and to a set of signal processing nodes 108. Each such set of nodes may be coupled to a respective radio frequency (RF) measurement source/device. In FIG. 1, classification nodes 102 are coupled to RF measurement sources 104, and signal processing nodes 108 are coupled to RF measurement sources 110. In various embodiments, central coordination server 114 may operate as a coordination server that coordinates classification nodes 102 and signal processing nodes 108. Classification nodes 102 and signal processing nodes 108 may be configured to communicate with central coordination server 114 over a variety of wired and unwired communication paths, and combinations thereof, chosen based an application. In some embodiments, central coordination server 114 may be a computer system or distributed computer system configured for performing functions or parts of functions of central coordination server 114 described herein, and more specifically may include core logic, user/system interfaces, sub-controllers for generating and sending commands to signal processing nodes 108 and classification nodes 102 (i.e., signal processing node controllers and classification node controllers), classification results processors, and a node database. Central coordination server 114 may be coupled to or communicate with user/external system 122, which send commands and signal information 126 to central coordination server 114 related to performing spectrum monitoring and analysis, and receive results 124 of such monitoring and analysis from central coordination server 114.

RF measurement sources 104 and RF measurement sources 110 are radio devices configured to sample RF signals in a wireless environment and provide the sampled RF signals (RF measurements 106 and RF measurements 112, respectively) to classification nodes 102 and signal processing nodes 108, respectively. In one embodiment, RF measurement sources 104 and RF measurement sources 110 may include one or more software defined radios (SDRs). As non-limiting examples, functional modules of such SDRs may be implemented in software, hardware, an embedded system, and combinations thereof. By way of non-limiting example, such SDR software may be based on GNU Radio, GNU Radio Companion, and GNU Radio Blocks. By way of non-limiting example, hardware implementations of such SDRs may be based on USRP B210, X310, or HackRF One.

Classification nodes 102 are configured receive RF measurements 106 from RF measurement sources 104 and perform wireless signal classification and provide classification results 116 to central coordination server 114. Notably, classification nodes such as classification nodes 102 may be physically located with RF measurement sources 104 or may be located remote from RF measurement sources 104. When RF measurement sources 104 and classification nodes 102 are physically located together, as non-limiting examples, they may be incorporated as hardware and/or software modules of a single computer system, or RF measurement sources 104 and classification nodes 102 may be separate computer systems coupled together by a wired communication link. When RF measurement sources 104 and classification nodes 102 are not physically located together, as non-limiting examples, RF measurements 106 may be received by classification nodes 102 over a communication network or from a memory device on which RF measurements 106 are recorded. RF measurements 106 received by classification nodes 102 may be raw samples generated by RF measurement sources 104 but they may also be pre-processed. As a non-limiting example, a data warehousing architecture may be used for the data journey from RF measurements 106 to classification nodes 102, where data is cleansed and reformatted for classification nodes 102.

Classification nodes 102 are configured to operate as wireless signal classifiers as well as operate as a utility performance monitors. In disclosed embodiments, classification engines of respective classification nodes 102 are configured to perform ensemble classification processes (as more fully described herein) on an assigned frequency. Meanwhile, in disclosed embodiments, performance monitor engines of respective classification nodes 102 may be configured to collect system performance data about classification nodes 102 and data about classification processes, and determine whether or not to adjust an amount of processing being performed based on the collected information.

In one embodiment, when a classification node of classification nodes 102 comes online, it may be configured to register with the central coordination server 114 and await commands and config 118 from central coordination server 114. More specifically, the classification node awaits operating frequency information included with commands and config 118 about an assigned frequency, from central coordination server 114.

Respective signal processing nodes 108 may be configured for a variety of signal processing features and functions, which may overlap or be different than signal processing functions of other signal processing nodes 108. As non-limiting examples, such functions may include recording wireless signals of one or more wireless signal classes, demodulating a wireless signal of a wireless signal class, reverse engineering a protocol of a wireless signal, and localization of a wireless signal. Respective signal processing nodes 108 may include specialized hardware and software for performing such functions. As a non-limiting example, a node of signal processing nodes 108 that specializes in recording a wireless signal may include an RF measurement sources 110 having an SDR for a specific RF band and a memory architecture for recording the wireless signal. By way of another non-limiting example, a node of signal processing nodes 108 that specialize in demodulation of signals and data packet capture may include demodulation software, including software for demodulating specific wireless signal classes 218.

In one embodiment, when respective signal processing nodes 108 come online, they register with central coordination server 114. The registration requests sent by signal processing nodes 108 includes information about the capabilities of respective signal processing nodes 108. Respective signal processing nodes 108 may have different capabilities (i.e., be configured to perform different functions) and may or may not be located in different geographic locations. Once registration is complete, a node awaits commands and config 120 from central coordination server 114. In disclosed embodiments, central coordination server 114 may direct respective signal processing nodes 108 to perform additional processing on a signal, based on a node's capabilities.

Figure 2:
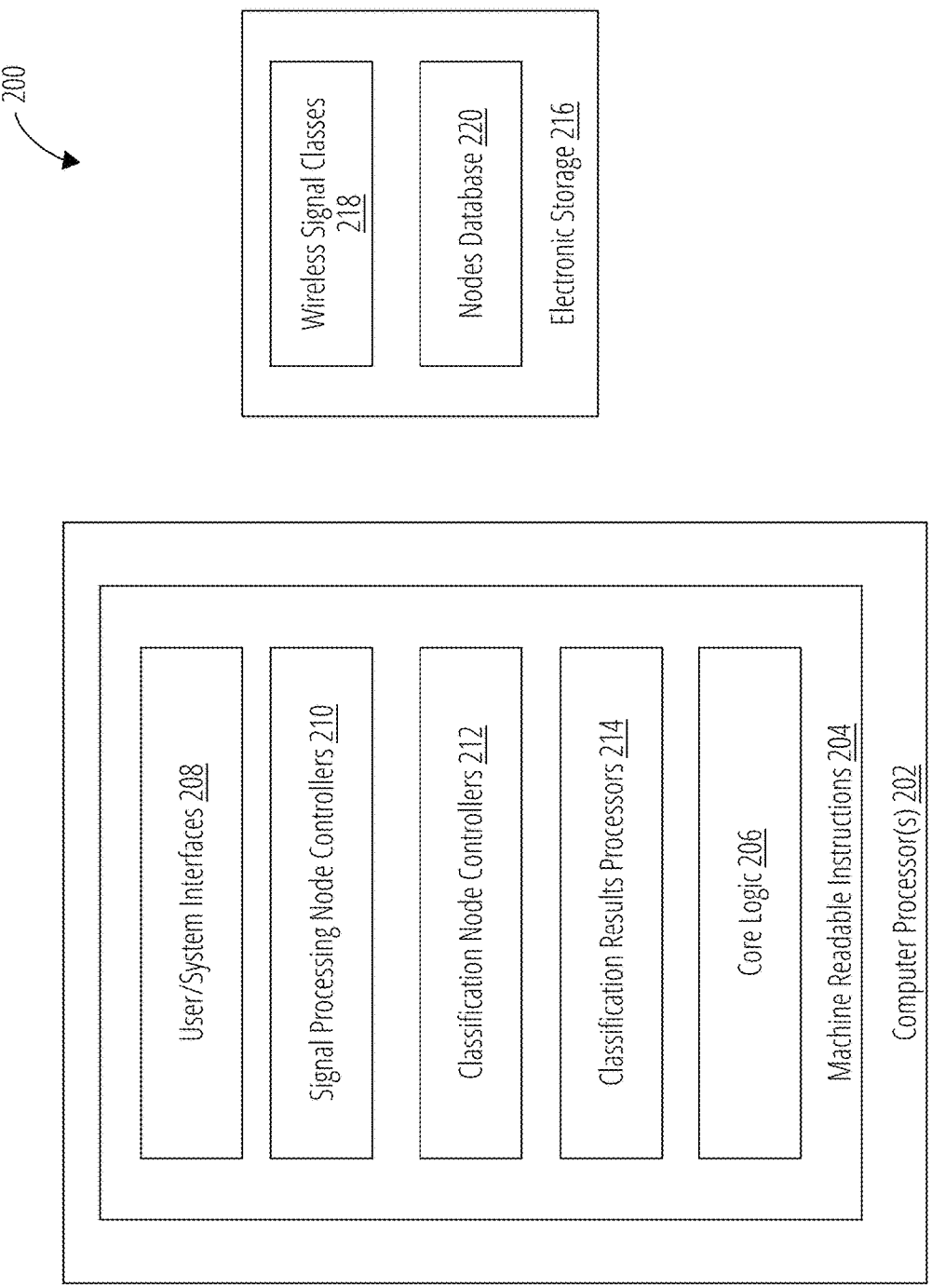
FIG. 2 illustrates a central coordination server in accordance with one or more embodiments.

FIG. 2 shows a simplified block diagram of a central coordination server 200, operable, for example, as a central coordination server 114 of FIG. 1. Central coordination server 200 may include electronic storage 216, one or more computer processors 202, and/or other components (e.g., input/output devices, display devices, networking equipment, without limitation).

Central coordination server 200 may include one or more engines for performing various functions of central coordination server 200 described herein. In the embodiment shown in FIG. 2, engines are shown as computer machine readable instructions 204, however, it should be appreciated that these modules may be implemented in analog circuits or digital circuits, and combinations thereof. Shown in FIG. 2 are engines for core logic 206, user/system interfaces 208, signal processing node controllers 210, classification node controllers 212, and classification results processors 214. Central coordination server 200 may also include electronic storage 216 (i.e., a non-transitory computer readable storage medium) configured to store information about wireless signal classes 218 and nodes database 220.

Core logic 206 is configured to tie the other parts of the central coordination server 200 together. User/system interfaces 208 is configured to enable interaction between central coordination server 200 and a user or broader system. Classification results processors 214 is configured to process results sent to the controller by classification nodes. Nodes database 220 is configured to store information about signal processing and classification nodes that are registered with the system, including locating information (e.g., internet protocol (IP) address, without limitation) and capabilities.

Signal processing node controllers 210 and classification node controllers 212 are configured to handle interactions between the central coordination server 200 and signal processing nodes 108 and classification nodes 102, respectively. As non-limiting examples, interactions may include tasks such as registration, registration, and starting nodes to carry out various operations.

Figure 3:
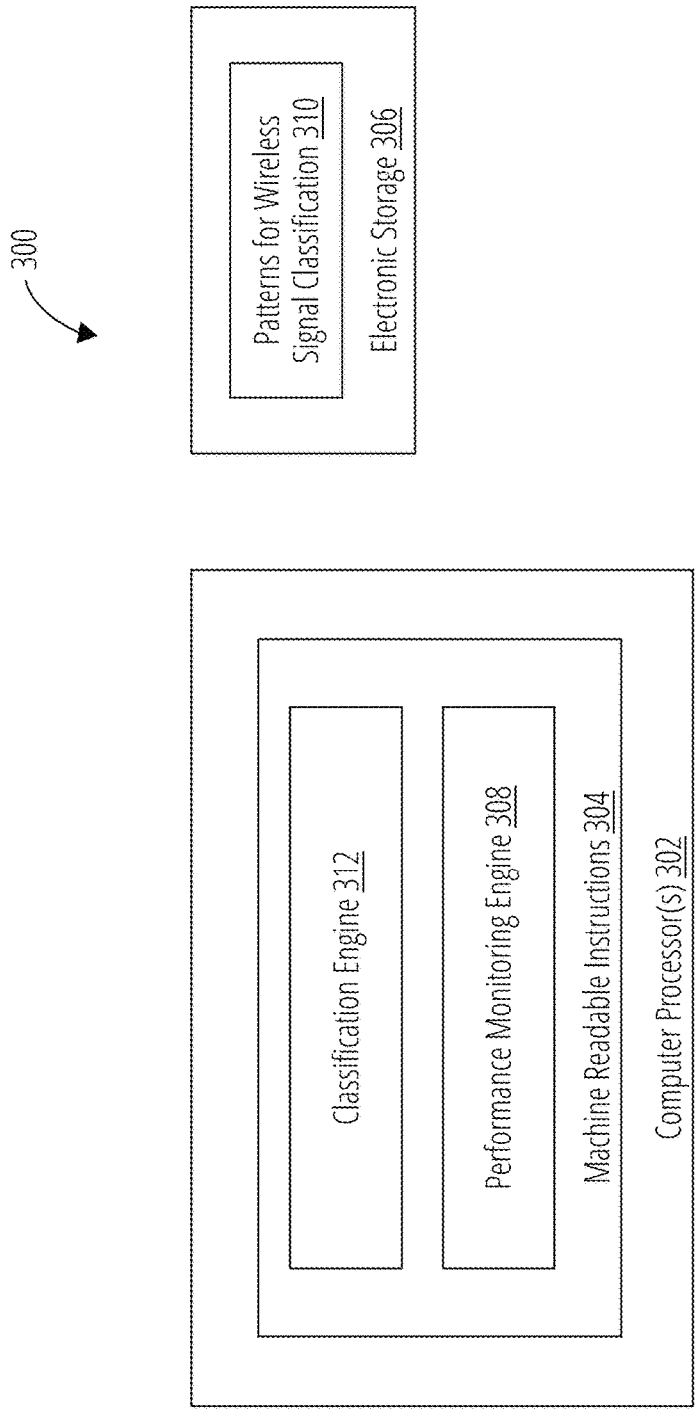
FIG. 3 illustrates a classification node in accordance with one or more embodiments.

FIG. 3 shows a simplified block diagram of an embodiment of a classification node 300 operable as one or more of the classification nodes 102 of FIG. 1.

In the embodiment shown in FIG. 1, classification node 300 is implemented in a computer. Machine readable instructions 304 for various modules for signal classification, registration, performance monitoring, and administration of classification node 300 may be executed by computer processors 302. Specifically, machine readable instructions 304 for a classification engine 312 and a performance monitoring engine 308 are shown in FIG. 3.

Classification engine 312 is configured, generally, to perform embodiments wireless signal classification described herein. Performance monitoring engine 308 is configured, generally, to perform embodiments of performance monitoring described herein. Both classification engine 312 and performance monitoring engine 308 may be configured to use information stored at electronic storage 306. In the embodiment shown in FIG. 3, patterns 310 for wireless signal classification are stored at electronic storage 306, and may be accessed and used by classification engine 312 to perform embodiments of wireless signal classification techniques described herein.

Some embodiments of the disclosure relate, generally, to a wireless signal classification scheme that may be used for spectrum monitoring and analyzing, and incorporated into systems such as the spectrum monitoring and analyzing system described above. In one embodiment of the classification scheme, an efficient (in terms of computation resources) classification technique is run continuously, and one or more compute-intensive, but more accurate, classification technique(s) run occasionally. Classification result (s) are based on weighted combination of the individual results of the efficient and compute-intensive techniques. In one embodiment, the efficient classification technique is a machine-learning-based technique that uses a supervised or unsupervised algorithm. In one embodiment, the machine-learning based technique is a single and/or multi-class SVM (support vector machine). In one embodiment the compute-intensive classification technique is an energy-based classification technique.

Figure 4:
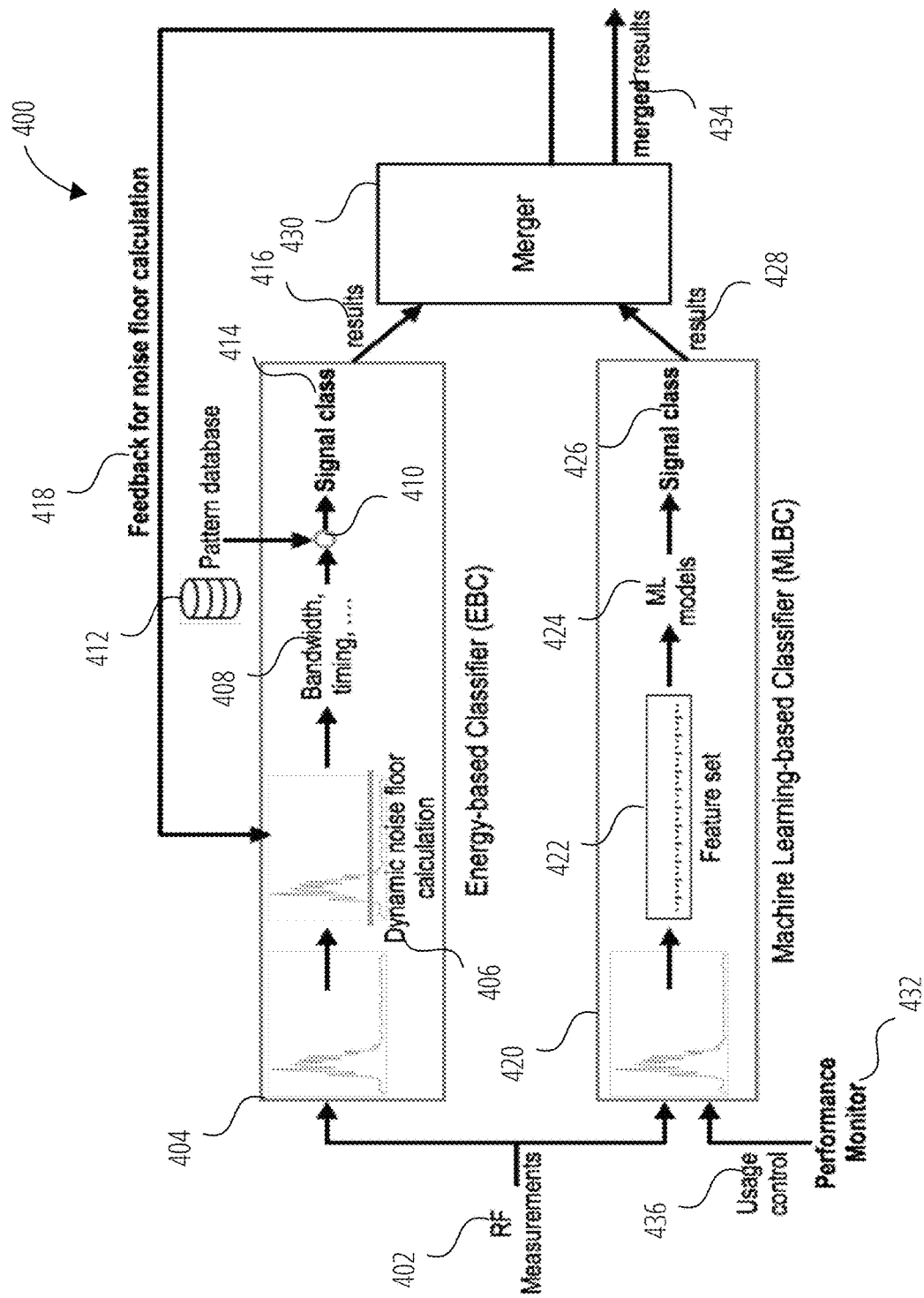
FIG. 4 illustrates a system for performing wireless signal classification in accordance with one or more embodiments.

FIG. 4 shows a functional block diagram of a system 400 for performing wireless signal classification, in accordance with disclosed embodiments. In the embodiment shown in FIG. 4, system 400 includes engines for energy-based classifier (EBC) 404, machine learning-based classifier (MLBC) 420, and merger 430.

In block 406, energy-based classifier (EBC) 404 performs a dynamic floor cutoff calculations using input RF measurements 402. In block 408, energy-based classifier (EBC) 404 performs bandwidth and timing analysis of the data above the dynamically calculated noise floor cutoff and extracts bandwidth and timing information about the data. Energy-based classifier (EBC) 404 uses the bandwidth and timing information to determine if a warless signal is present or not (i.e., detect a wireless signal) in the RF measurements 402.

If energy-based classifier (EBC) 404 determines a wireless signal is present in the data then, in block 410, energy-based classifier (EBC) 404 performs pattern analysis to determine and assign a signal class 414 to the detected wireless signal based, at least in part, on the bandwidth and timing information extracted from RF measurements 402 and known patterns 412 of signal parameters. Stated another way, energy-based classifier (EBC) 404 is configured to detect that signal class 414 is present in RF measurements 402.

In various embodiments, when performing wireless signal classification, energy-based classifier (EBC) 404 will typically attempt to detect multiple known signal classes in RF measurements 402 using known patterns 412. So, energy-based classifier (EBC) 404 may be understood as implementing multiple signal classification processes, each such classification process configured to detect a different signal class in RF measurements 402. Energy-based classifier (EBC) 404 provides EBC results 416 to merger 430, which includes the signal class 414 assigned to the signal detected in the data and may also include at least some of the timing and bandwidth information for the signal. As non-limiting examples, EBC results 416 may include one or more of signal type, frequencies and frequency bands, scores, and counts for detected signals.

In block 422, machine learning-based classifier (MLBC) 420 computes a feature set for RF measurements 402, and then, in block 424, uses pre-trained machine learning models on the computed feature set to predict whether a signal is present in the RF measurements 402 that belongs to one of the signal classes associated with the ML models. Machine learning-based classifier (MLBC) 420 provides MLBC results 428 to merger 430, which includes the assigned block 426. Notably, MLBC results 428 may include a single assigned class or include a list or curated list of signal classes that machine learning-based classifier (MLBC) 420 predicts a signal may belong to with a confidence score.

Merger 430 combine EBC results 416 and MLBC results 428 and forwards on the merged results 434 to, e.g., a central coordination server 114 of FIG. 1.

In some embodiments, energy-based classifier (EBC) 404 may be configured to "tune" to a noise level of its surrounding environment, as more fully described later in this disclosure. In the embodiment shown in FIG. 4, merger 430 sends feedback 418 about merged results 434 to energy-based classifier (EBC) 404. Energy-based classifier (EBC) 404 is configured to use feedback 418 to improve its dynamic noise floor calculation at block 406, which in turn improves the capability of energy-based classifier (EBC) 404 to dynamically track and adapt to noise levels of a surrounding environment, and improves its classification performance more generally.

In some embodiments, system 400 may be configured to control usage of machine learning-based classifier (MLBC) 420 in order to meet real-time performance requirements. In one embodiment, performance monitor 432 is configured to send adjustment commands 436 to machine learning-based classifier (MLBC) 420 to control a frequency of usage of machine learning-based classifier (MLBC) 420. Performance monitor 432 may be configured to choose and send adjustment commands 436 based on real-time performance requirements of classification engine 312 as more fully described later in this disclosure. Notably, taking into account real-time performance requirements enables system 400 to adapt to available computer resources and hardware configurations without necessarily modifying the computer's operating system or hardware configuration.

Figure 5:
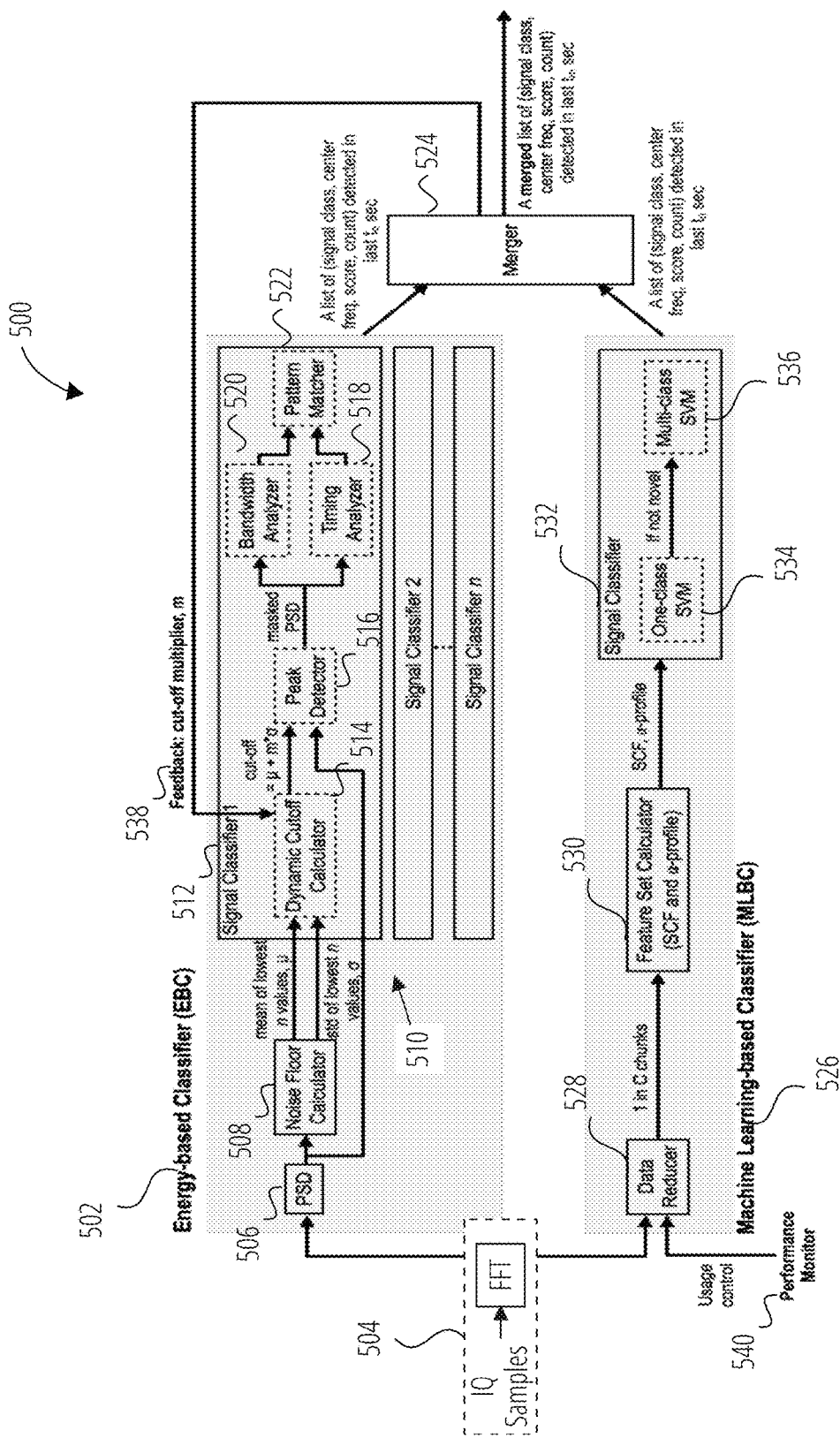
FIG. 5 illustrates a classification architecture for performing wireless signal classification in accordance with one or more embodiments.

FIG. 5 is a simplified block diagram of a system 500, which is an embodiment of classification architecture for performing wireless signal classification shown in FIG. 4.

In the embodiment shown in FIG. 5, EBC 502 includes a Power Spectral Density (PSD) calculator, PSD 506, a noise floor calculator 508, and signal classifiers 510. Respective signal classifiers 510 may include a dynamic cutoff calculator, a peak detector, a bandwidth and/or timing analyzer, and a pattern matcher, although only signal classifier 512 is shown in detail in FIG. 5. PSD 506, noise floor calculator 508, and dynamic cutoff calculator 514 are configured to dynamically compute a noise floor cutoff used for energy based classification. In some embodiments, the computation of the noise floor cutoff changes over time based on feedback 538 from merger 524, which enables EBC 502 to tune to the noise level of the environment in which it is deployed.

In the embodiment shown in FIG. 5, RF measurements 504 are samples of quadrature signals commonly referred to as "IQ samples," for which a fast-Fourier transform has been computed. Pattern matcher 522 is configured to receive the features and make a final classification (i.e., output a result that indicates whether the signal class of signal classifier 512 was detected in RF measurements 504) based on the received features.

Peak detector 516, bandwidth analyzer 520, and timing analyzer 518 are configured to extract features used for energy based classification from RF measurements 504. Peak detector 516 is configured, generally, to identify signal peaks that standout from the general noise level, and so may indicate a signal. Bandwidth analyzer 520 is configured, generally, to compute set of contiguous bins from the FFTs that are above the calculated noise floor cutoff using the information received from PSD 506. For every set of inputs bandwidth analyzer 520 receives, it is configured to search for contiguous sets of bins that are above the threshold (i.e., the calculated noise floor cutoff).

Timing analyzer 518 is configured, generally, to track active and inactive intervals for each bin computed by bandwidth analyzer 520. In one embodiment, timing analyzer 518 is configured to consider a bin active if it was considered part of a signal by peak detector 516, and configured to consider a bin inactive if not considered active. Timing analyzer 518 sends information about the amount of time bins were active and inactive (after a state change) to pattern matcher 522. In one embodiment, timing analyzer 518 has a two-state state machine that it maintains for every entry in the information it receives from the peak detector 516.

In disclosed embodiments, pattern matcher 522 may be configured to determine if a particular signal (i.e., a signal corresponding to a known signal class) is present or not in RF measurements 504 by comparing the received bandwidth and/or timing results received from bandwidth analyzer 520 and timing analyzer 518, respectively, against a known set of parameters for a known signal class. As a non-limiting example, an IEEE 802.11g signal using orthogonal frequency-division multiplexing (OFDM) uses approximately 16.6 MHz of spectrum, so a pattern is matched against RF bands found by bandwidth analyzer 520 to be present in RF measurements 504. Similarly, timing patterns such as Short Interframe Spacing (SIFS) inactive intervals and active transmission times required for packets based on various data rates are compared against inactive and active timing information found by timing analyzer 518. As another non-limiting example, a ZigBee pattern matcher takes just the RF bands found by bandwidth analyzer 520 and compares it to the expected 2 MHz of spectrum occupancy for ZigBee.

In one embodiment, upon detecting a match, pattern matcher 522 is configured to compute a classification score of a classification for a band (s,f). In one embodiment, a classification score may be calculated using Equation 1:

$$\text{score}_{s_i f} = \frac{\text{count}_{s_1 i}}{\max_{b \in B} \text{count}_{s,b}} \qquad \text{Equation 1}$$

In Equation 1, $\text{count}_{s1,f}$ is the number of time band s,f has appeared since the last update and $\max \text{count}_{s,b}$ is the maximum number of times any band has appeared since the last update. Results may be stored for a set time period, to, before being sent to merger 524.

Turning to MLBC 526, in the embodiment shown in FIG. 5, MLBC 526 includes data reducer 528, feature set calculator 530, and signal classifier 532.

MLBC 526 is configured to receive usage adjustment commands from performance monitor 540, and to change the frequency with which MLBC 526 is turned on for classification. Data reducer 528 is configured to form C chunks of data, where respective chunks have enough contiguous samples to calculate one feature set needed for machine learning models. In one embodiment, only one chunk is forwarded to feature set calculator 530 and the other chunks are discarded. As non-limiting examples, algorithms used to select the forwarded chunk may include select the first chunk, select chunkN each time, randomly select a chunk. An algorithm that uses random selection may selected if missed detection of signals that are being transmitted during off-period of MLBC is a concern. The frequency at which data is chunked or chunks are forwarded will affect the frequency at which MLBC 526 performs wireless signal classification.

Feature set calculator 530 is configured to determine a feature set using forwarded chunks of data (i.e., chunks of RF measurements 504) from data reducer 528. Feature set calculator 530 sends the determined feature set to signal classifier 532 for pattern matching.

Some disclosed embodiments relate, generally, to classifying a known signal in different operating frequencies than the signals used to train a classifier. By way of explanation and not limitation, classifiers may be trained using signals present in specific parts of a frequency spectrum, but generally speaking, signals of that type may be present in other parts of a frequency spectrum. For example, signals of the same class may be present in different channels and so appear in different parts of a frequency spectrum. So, signals of the same class that appear in different parts of a frequency spectrum are typically clustered (i.e., grouped) together. In some embodiments, a "shift-invariant feature representation"—i.e., a feature insensitive to shifts along the frequency axis—is used for known and unknown signals. In one embodiment, an alpha-profile is used as a shift-invariant feature representation.

Notably, in disclosed embodiments that use shift invariant feature representation, signals of a class are not identified as "unknown signals" (e.g., by signal classifier 532) simply because the signals are present in a different part of a frequency spectrum than the signals used to train a signal classifier 532. So, in the case of hardware or implementation changes within a wireless environment, simply changing a channel used by a Wi-Fi modem or Bluetooth device would not necessarily result in a new signal classifier unless a shift-invariant feature representation changes.

In the embodiment shown in FIG. 5, cyclostationary characteristics of signals are used for shift-invariant feature representation. Feature set calculator 530 computes a Spectral Correlation Function (SCF) to capture cyclostationary characteristics using a time smoothing method, as set forth in Equation 2:

$$SCF(F, \alpha) = \frac{1}{L}\sum_{l=1}^{L} FFT_l[f] x FFT_l^*[f - \alpha] \quad \text{Equation 2}$$

$FFT_1$ is the lth FFT of the signal at frequency f, $FFT_1[f-alpha]$ is the complex conjugate of the FFT of the signal at frequency bin, f shifted by alpha. Feature set calculator 530 next computes an alpha-profile from the SCF, as set forth in Equation 3:

$$y = \max_{\alpha} SCF(f, \alpha) \quad \text{Equation 3}$$

The alpha-profiles of different signals show spikes at different alpha related to the periodicity of the corresponding signal. Besides, alpha=profile is invariant to center frequency offset. Therefore, using alpha-profile, machine learning models may be trained without using data corresponding to all possible center frequency offsets.

As a non-limiting example, shift-invariant feature sets may include one or more cyclostationary feature. Notably, data reducer 528 and performance monitor 540 may be configured to automatically handle changes in frequency of MLBC 526 usage in order to incorporate different types of feature set computation and machine learning models.

Signal classifier 532 is configured to use pre-trained machine learning models with the input feature sets for signal class prediction. In the embodiment shown in FIG. 5, signal classifier 532 includes a one-class SVM 534 and a multi-class SVM 536. One-class SVM 534 is configured as a novel signal detector, that is, to detect that an alpha-profile provided by feature set calculator 530 is associated with an unsupported signal class (i.e., a signal that is novel to signal classifier 532). Using a one-class SVM model reduces the chances of noise or unsupported signal types being classified as one of the supported signal classes.

If one-class SVM 534 predicts that the alpha-profile is not novel (i.e., belongs to one of the supported signal classes) then signal classifier 532 runs a pre-trained multi-class SVM 536 to determine the signal class. Multi-class SVM 536 also provides a prediction of the signal class, which is saved as a score value for a detected signal. Signal classifier 532 computes the center frequency of the detected signal using the other column of the input SCF, which contains the magnitudes of the input FFTs averaging over L FFTs. In one embodiment, the center frequency computation may be performed by finding the center of the bin values of width equal to the bandwidth of the detected signal class that have maximum sum. Signal classifier 532 stores result for a set period of time to and after to it forwards the stored results to merger 524.

Each of EBC 502 and MLBC 526 may be configured to maintain a list of detected signal classes (s), corresponding center frequency (f), the number of times a signal s at f has been detected (count), the classification score for detected s, f (score) over an update period, $t_o$. The score values will typically be in the range of (0.0, 1.0), where a values of about 0.0 means very little confidence in a classification, a value of about 1.0 mean very high confidence in a classification, with a sliding scale for values between 0.0 to 1.0.

At each update period to, both EBC and MLBC send a list of s, f, count, score to merger 524. Merger 524 tracks the received results from both classifiers and updates score and count values if results for the same s, f, are received from the same classifier. As a non-limiting example, merger 524 may update score and count values using Equation 4 and Equation 5, set forth below:

$$\text{new score}_{s,f} = \frac{e \text{ count}_{s,f} * \text{score}_{s,f} + \text{count}_{s,f} * \text{score}_{s,f}}{e \text{ count}_{s,f} + \text{count}_{s,f}} \quad \text{Equation 4}$$

$$\text{new score}_{s,f} = e \text{ count}_{s,f} + \text{count}_{s,f} \quad \text{Equation 5}$$

In Equations 4 and 5, $e\ \text{count}_{s,f}$ and $e\ \text{score}_{s,f}$ are current count and score values for s,f. $\text{Count}_{s,f}$ and $\text{score}_{s,f}$ are 0 if no previous results are available. If a new entry does not match an existing entry in terms of center frequency, the new entry is simply added to the set of existing entries.

At each time period, tm, merger 524 is configured to combine the results from both classifiers and computes a $\text{merged\_score}_{s,f}$ for all the s,f in the results. As a non-limiting example, merger 524 may calculated a merged score using Equation 6, set forth below:

$$\text{merged score}_{s,f} = \frac{\omega|E * \text{score}_{s,f,E} + \omega_M * \text{score}_{s,f,M}}{\# \text{ of classifiers that reported for } s} \quad \text{Equation 6}$$

In Equation 6, $w_E$ and $w_M$ are pre-defined weights for the classifiers, $score_{s,f,E}$ and $score_{s,f,M}$ are the score values for s, f, from the results sent from the EBC and MLBC, respectively. If a particular s, f is not reported by a classifier, the corresponding score ($score_{s,f,E}$ or $score_{s,f,M}$) is set to zero.

During the merging process performed by merger 524, signals that are detected by both of EBC 502 and MLBC 526 will typically have a higher merged score than signals reported by only one classifier. Notably, in some cases EBC 502 and MLBC 526 may agree on actual signals but disagree on false positives, which helps the overall classification engine discard false positives.

One challenge in performing an energy-based classification approach is determining a noise floor of a received signal and a noise floor cutoff based on that noise floor, i.e., determining which part of the received signal to consider as an actual "signal" versus background noise.

Some embodiments of the disclosure relate, generally, to a noise-adaptive monitoring and analysis system that automatically adapts to available computational resources and a surrounding noise level. The classification technique is adapted to the noise level of a surrounding environment. Embodiments that implement one or more noise-adaptive features may be deployed in different kinds of environments such as indoor, dense urban, etc., without requiring any manual configuration or changes in the classification process. One embodiment of a noise-adaptive monitoring and analysis system includes a feedback mechanism from the merged result to the compute-intensive classification process (e.g., an energy-based classification process) to aid its dynamic floor calculation and improve its accuracy.

In some embodiments, EBC 502, is configured to compute a noise floor from a lowest n power values provided by PSD 506. As a non-limiting example, noise floor cutoff may be calculated using Equation 7:

$$\text{noise floor cutoff} = \mu + m*\sigma \qquad \text{Equation 7}$$

In Equation 7, ($\mu$) and ($\sigma$) are mean and standard deviation, respectively, of the lowest n power values provided by PSD 506, respectively, and m is a multiplier. A higher value of m will result in a higher cutoff value. By calculating a noise floor cutoff for each PSD 506 over time, the cutoff changes dynamically as changes (i.e., increases/decreases in the amount of background noise) occur in the deployed environment.

Merger 524 provides feedback 538 to dynamic cutoff calculator 514 in order to dynamically adjust the multiplier value m over time. In one embodiment, feedback 538 is a linear function square-of-differences in the number of results, (NE) and (NM), reported from EBC 502 and MLBC 526, respectively. Notably, if MLBC 526 reports more signals than EBC 502, then EBC 502 is likely using a higher noise floor cutoff value thus missing parts of the signal to be detected. In some embodiments, merger 524 may be configured to send a command to EBC 502 to use a lower value for m. Likewise, in a case when MLBC 526 reports more signals than EBC 502, merger 524 may be configured to instruct EBC 502 to use a higher value for m. Among other advantages, it should be appreciated that feedback 538 improves the capability of system 500 to adapt to its environment at run time and be less susceptible to bad initialization parameters.

Determining the amount of processing (i.e., amount of processing of RF measurements) that can be dedicated to a machine learning-based classifier is a challenge. More processing by MLBC 526 will improve classification results of system 500 quicker in a variety of environments, for example, if transient signals are involved. The amount of available resources on a classification node will vary, for example, due to other processes on the computer system starting or stopping, changes in processing required by other processes, without limitation.

Some embodiments of the disclosure relate, generally, to an auto-tunable monitoring and analysis system. In one embodiment, the frequency of the usage of the compute-intensive classification technique(s) is automatically adjusted based on the available system resources (e.g., automatically tuned). In one embodiment, a performance monitor (e.g., a software application) is configured to gather information from an operating system and a classifier/classification engine. As non-limiting examples, information gathered from the operating system may include a current processing load and a current network buffer allocation for sockets associated with a process (e.g., a machine learning based classification process). The performance monitor may obtain information from the classifier both actively, such as requesting a process's identifier (ID) and its current settings, and passively by monitoring output coming from the process.

In one embodiment, a performance monitor is configured to use a combination of reactive and proactive techniques to make adjustments to processing load. By way of example, adjustments may be made due to poor throughput (e.g., not processing samples quickly enough). Moreover, the performance monitor may be configured to predict when packets will drop in the future, for example, by monitoring network buffer usage information. The performance of the reactive and proactive techniques may be continuously improved/customized through machine-learning. For example, in the case of poor throughput, the performance monitor may be configured to decrease the number of samples sent to a machine learning-based classifier responsive to network buffer usage. Machine learning may be used to tune the response based on buffer size to account for differences in buffer sizes between machines and changes to buffer size in a machine over time.

Figure 6:
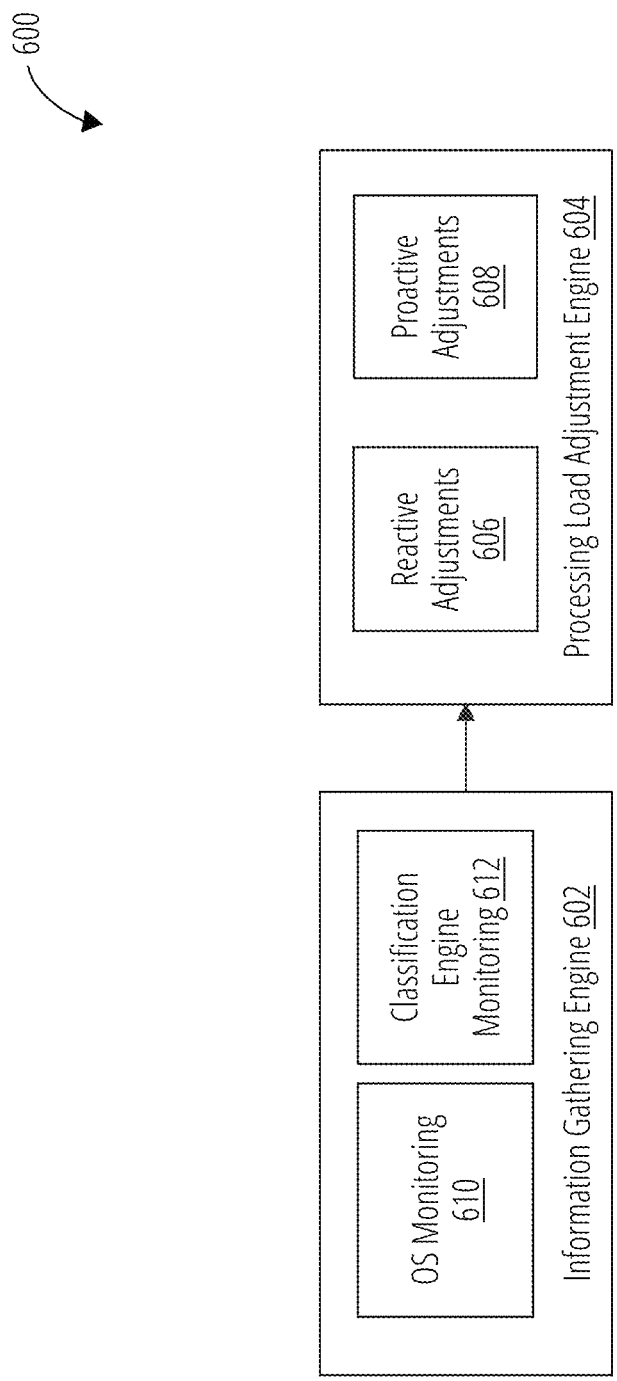
FIG. 6 illustrates a performance monitoring engine in accordance with one or more embodiments.

FIG. 6 shows block diagram of a performance monitoring engine 600, in accordance with disclosed embodiments.

Information gathering engine 602 is configured, generally, to gather information about the performance of a machine learning-based classification process (i.e., monitor the process). As non-limiting examples, information may be gathered from an operating system and/or a classification engine. Information gathered from the operating system may include, as non-limiting examples, the current processing load and the current network buffer allocation for the sockets associated with a process. Information from the classification engine may be obtained both actively, such as requesting the process' ID and its current settings, and passively by monitoring output coming from the process.

Processing load adjustment engine 604 may be configured to use a combination of reactive and proactive approaches to make adjustments in processing load. In one embodiment, reactive adjustments 606 is configured to detect that samples are not being processed fast enough and propose that the performance monitoring engine 600 decrease the amount of samples sent to the machine learning-based classifier. As a non-limiting example, Classification Engine Monitoring 612 may report that an overflow occurred or packets were dropped at the classification engine. Reactive adjustments 606 interprets the report to mean that samples are not being processed quick enough and respond by decreasing the amount of samples sent to the machine learning classifier. As non-limiting examples of an adjustment parameter may include number of samples of a group and group size (i.e., number of samples in a group). Moreover, proactive adjustments 608 also receives the report from Classification Engine Monitoring 612 and updates historical data and modeled packet drop behavior. Proactive adjustments 608 predicts dropped packets based on its modeled packet drop behavior as well as network buffer usage information sent by OS monitoring 610 for sockets associated with data transfer.

Figure 7:
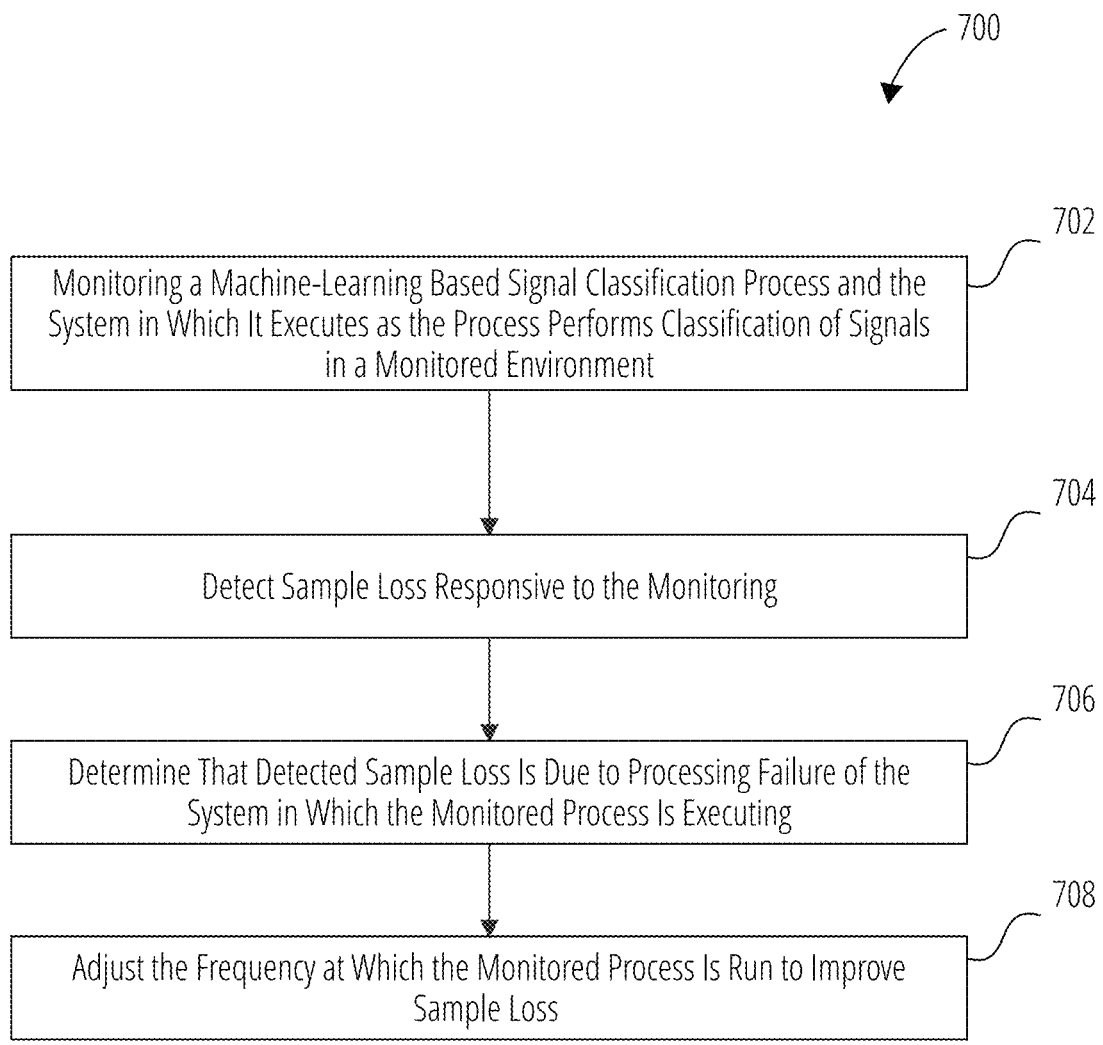
FIG. 7 illustrates a performance monitoring and load adjustment process in accordance with one or more embodiments.

FIG. 7 shows a flowchart for a performance monitoring and load adjustment process 700, in accordance with disclosed embodiments.

In operation 702, a machine learning-based signal classification process (e.g., MLBC 526) and the computing system in which it executes is monitored as the process performs classification of signals in a monitored wireless environment. In one embodiment, monitoring includes receiving information from the operating system of the computer system and the classification engine itself. In one embodiment, received information form the operating system may include information about a current processing load and/or a network buffer allocation. In one embodiment, monitoring the classification engine may involve both active monitoring and passive monitoring. In one embodiment, active monitoring involves requesting information about the process identifiers and configuration/settings of the process. In one embodiment passive monitoring involves inputs and/or outputs of a classification process.

In operation 704, sample loss is detected and/or predicted responsive to the monitoring in operation 702. In one embodiment, sample loss may be detected responsive to current sample loss and/or predicted sample loss. In one embodiment, predicted sample loss may be detected based on one or more trained models of sample loss behavior of the system and/or classification process. In one embodiment, a model of sample loss behavior may be a model of packet drop behavior by the system in which the monitored machine learning-based classification process is executing.

In operation block 706, it is determined the sample loss (actual or predicted) is or will be due to a processing failure of the system in which the monitored process is executing. In one embodiment, a processing failure may be determined because the classification process cannot (or will not be able to) keep up with the rate at which samples are being sent to it. As non-limiting examples, processing rate failure may be determined because it is determined that the system is processing samples slower than the rate at which samples are arriving for classification (e.g., buffer overrun), or because a network socket cannot keep up with the rate at which packets arrive.

In operation 708, the frequency at which the monitored process is requested to classify samples is adjusted to improve the detected sample loss. In one embodiment, frequency adjustment may occur at system 500 by configuring data reducer 528. In another embodiment, frequency adjustment may occur at an RF measurement device such as RF measurement sources 104/RF measurement sources 110 (i.e., adjusting the rate at which samples are taken and sent to classification nodes).

Some embodiments relate, generally, to incrementally building learned models about unknown signals and deploying classifiers that use the learned models (or are the learned models) to classify signals. An aspect of such embodiments is that new classifiers may be built (i.e., created in software) and deployed in a monitoring system "on-the-fly" or automatically. Another aspect of such embodiments is that classes may be chosen for an application of a monitoring system, and then when a monitoring system is deployed, it may be "tuned" to the wireless environment by adding new classifiers over time. Yet another aspect of such embodiments is that the number of false positives and false negatives may be reduced over time—or conversely, accuracy of a deployed monitoring system may improve over time. Another aspect of such embodiments is that as hardware changes or implementation changes occur within a wireless environment, monitoring systems of the present disclosure adapt to those changes. For example, new signals may be identified.

Figure 8:
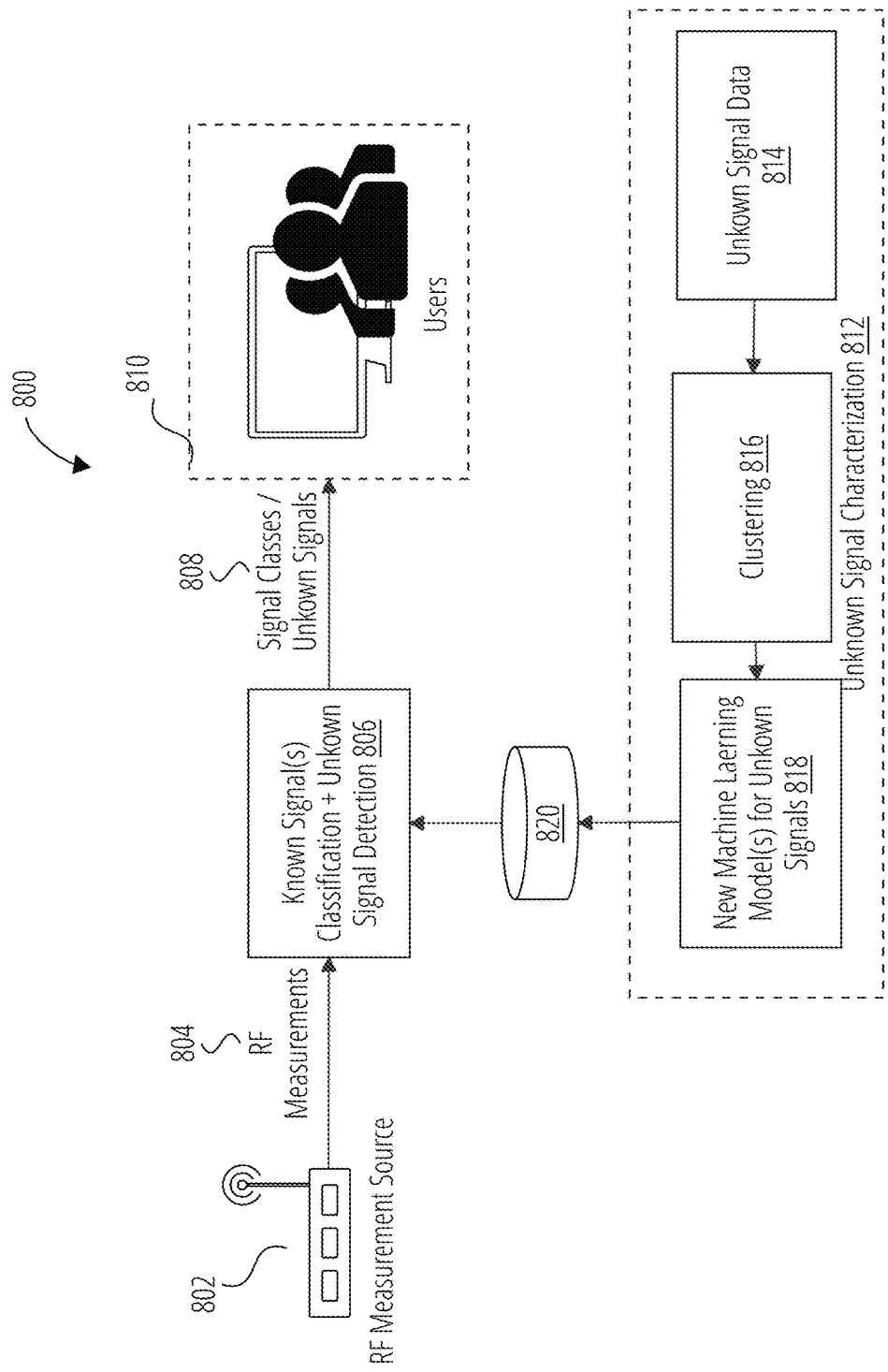
FIG. 8 illustrates a system for performing spectrum monitoring and analysis that incorporates incremental learning about signals in deployed environments, in accordance with one or more embodiments.

FIG. 8 shows a functional block diagram of a system 800 for performing spectrum monitoring and analysis that incorporates incremental learning about signals in deployed environments, in accordance with disclosed embodiments.

As an initial matter, system 800 is deployed with a number of pre-trained machine learning models for known signals. The initial set of pre-trained machine learning models at deployment may be chosen, as a non-limiting example, because they are trained to classify signal classes expected to be present in a target environment. Notably, unknown signals may in fact belong to widely used communication signal types, but are unknown as far as system 800 is concerned if system 800 does not have a trained model to classify the signal. The terms "known signal" and "supported signal" are used interchangeably in this disclosure, and the terms "unknown signal" and "unsupported signal" are used interchangeably in this disclosure.

In the embodiment shown in FIG. 8,

At block 806, known signals are classified and unknown signal detected using RF measurements 804 from RF measurement source 802. Results 808 including known signal classes and unknown signal classes are reported to users 810. At block 812, unknown signal characterization is performed on the detected unknown signals from block 806 using incremental learning techniques to train new classifiers to classify unknown signals.

For the unknown signal characterization process, at block 814 unknown signal data is received and at block 816 the data is clustered using clustering techniques (i.e., of the clustering type of unsupervised machine learning techniques) to find groups of unknown signals within the unknown signal data. At block 818, machine learning-based models for classifying unknown signals are created from the clustered groups of unknown signal data. New machine learning-based models are stored at database of ML models 820.

Figure 9:
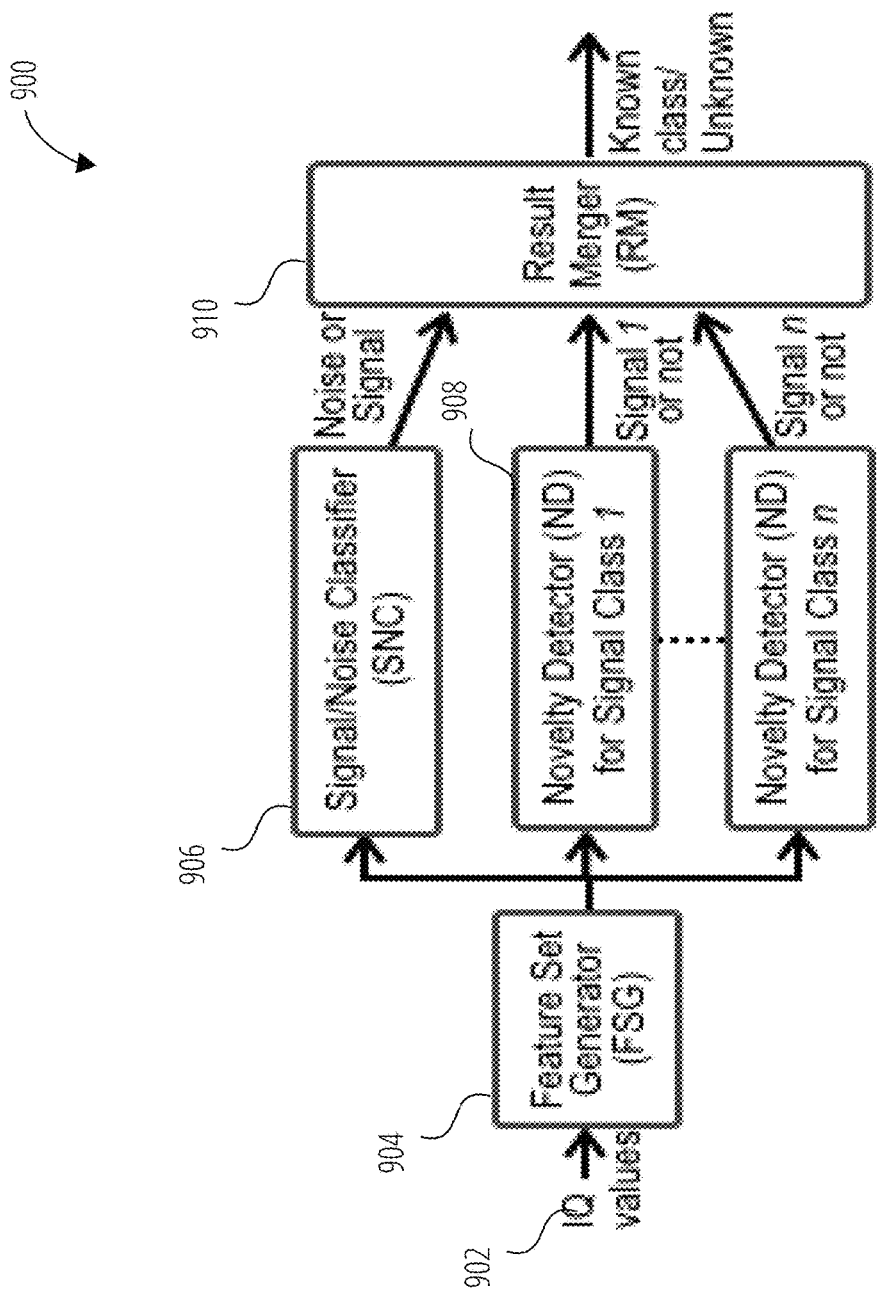
FIG. 9 illustrates a system for performing known and unknown signal detection in accordance with one or more embodiments.

FIG. 9 is a simplified block diagram of a system 900 for performing known and unknown signal detection in accordance with disclosed embodiments. In the embodiment shown in FIG. 9, a signal/noise classifier 906 and a series of novelty detectors 908 are configured to classify signals using measurements 902 and feature sets generated by feature set generator 904.

Signal/noise classifier 906 is configured as a binary classifier trained to classify an input as including a signal or not including a signal, which is interpreted as noise. In one embodiment, signal/noise classifier 906 is trained on both noise data and signal data. Training on both exploits the distinguishable characteristics of noise vs signal spectrograms (a set of FFTs). In one embodiment, signal/noise classifier 906 may be a convolutional neural network.

In one embodiment, training and test data for training signal/noise classifier 906 may be designed so that signal/noise classifier 906: (a) predicts that signals that are different than its training data are signals; (b) predicts signals shifted in frequency from training data as signals; and (c) predicts low signal-to-noise (SNR) signals are signals. In one embodiment, a training dataset may be created with signal examples having different positions (by shifting the signal data over the frequency axis), widths (by replicating signals multiple times), and signal to noise ratios (SNRs) (by adding noise to the spectrograms). A test dataset may be created with signal data from over-the-air captures that are different in terms of one or more of widths, positions, and SNRs than the training data. The test data may be used to evaluate the generality of different CNN architectures and hyperparameter values.

A series of novelty detectors 908, one for each known signal class, are also used to classify measurements 902. Novelty detectors employ novelty detection type machine learning algorithms to determine if input data (RF measurements) belong to a signal class or not. More specifically, novelty detectors 908 are configured to return a "1" or "true" if measurements 902 are different (i.e., belong to a different class) than the training data for a signal class.

Results from signal/noise classifier 906 and novelty detectors 908 are provided to merger 910, which is configured to determine a signal type based on the combined results. In one embodiment, merger 910 gives precedence to the result from signal/noise classifier 906 over the results from novelty detectors 908, and identifies a signal type as noise if signal/noise classifier 906 predicts noise. In another embodiment, merger 910 may be pre-configured to give precedence to one or more of the respective novelty detectors 908. As a non-limiting example, if one of the novelty detectors is more efficient at detecting very low SNR signals than signal/noise classifier 906, merger 910 is configured to give priority to the result from that novelty detector over the result from the signal/noise classifier 906. Generally, merger 910 will label a signal as unknown if all of the novelty detectors predict that it is not in their signal class and signal/noise classifier 906 predicts a signal. If multiple respective novelty detectors 908 predict signal then merger 910 is configured to label the signal as miscellaneous or provide all of the results with a low confidence score.

In one embodiment, autoencoder type neural networks are trained to be the novelty detectors 908. An autoencoder generates an error signal (called the reconstruction error) that is lower for inputs that belong to the same class as the training data and higher for inputs that do not belong to the same class as the training data. Each autoencoder is trained only on training data from a specific signal class, but test from other signal classes may be used. Each novelty detectors 908 is configured to compare the error signal to a threshold and if the error signal is above the threshold, returns that the signal is not in its signal class.

In one embodiment, training data for novelty detectors 908 is created using a feature set comprised of shift-invariant features, that is, features that do not vary based on where on the frequency axis a signal is present (based on the signals center frequency). One aspect of using shift-invariant features is that if a center frequency of a signal is shifted from where is typical for its signal class or just from the center frequency of the training data used for that signal class, a novelty detector can still accurately classify the signal. In one embodiment, m-SCF is used as the shift-invariant feature representation for the autoencoders. In one embodiment, m-SCF may be derived from the Spectral Correlation Function (SCF) by using a time smoothing method to calculate SCF (as described above), and m-SCF is computed from the magnitude of complex SCF. The result of m-SCF is an N-sized array where N is the FFT size being used. The m-SCF of different signals result in different patterns as a specific pattern depends on the signal waveform as well as the bandwidth, but more importantly, the same signals result in the same pattern even if the signals are shift in frequency (i.e., the center frequency is shifted in frequency). As a non-limiting example, ZigBee signals of different channels have substantially similar m-SCF patterns.

The first step toward using autoencoder based novelty detection is to choose the right model parameters for the autoencoder. Recall that an autoencoder is a combination of an encoder and decoder network as depicted in FIG. 5. Different hyperparameters need to be chosen (e.g., number of epochs, batch size, the values of nx; i.e., the number of nodes in layer x) as well as the network architecture (number of encoder/decoder layers). In order to choose the "best" values, a performance metric is needed. To this end, a cross-validation approach is used as described below. Under this metric, it is observed that choosing networks where the encoder and decoder have the same architecture (but in reverse) works well. It is also seen that having layers with increasing number of nodes performs better than decreasing.

Figure 10:
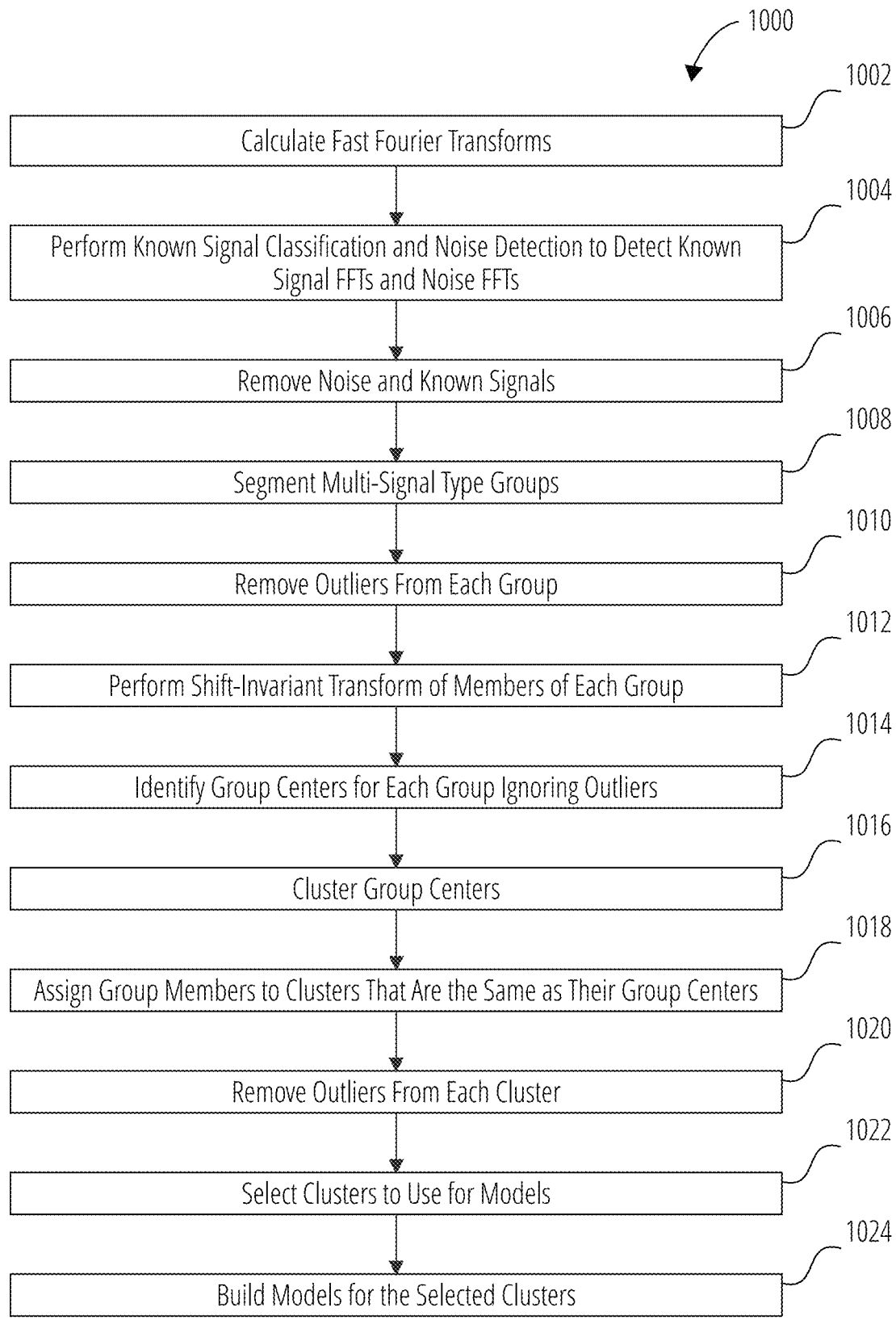
FIG. 10 illustrates an unknown signal characterization process in accordance with one or more embodiments.

FIG. 10 shows a flowchart of a process 1000 for performing unknown signal characterization, in accordance with disclosed embodiments. Generally, process 1000 exploits the fact that a single transmission will result in multiple continuous FFTs (e.g., one IEEE802.11g beacon corresponds to approximately 100 continuous 128-bin FFTs) and consecutive FFTs are most likely from the same clusters. So, process 1000 clusters only the group centers (i.e., mean value) and assigns labels to group members to be the same as the labels assigned to corresponding group centers. This approach thus greatly reduces the number of data points to work with.

For the embodiment shown in FIG. 10, the input to the process is a recording of IQ values over some period of time for identifying unknown signals present in that time frame. Operation 1002, operation 1004, and operation 1006 are performed to obtain frequency domain data and remove noise and known (if any) signal FFTs. In other embodiments where the input data is already in the frequency domain or does not include noise or known signal FFTs, process 1000 may begin at operation 1008.

Turning to process 1000, in operation 1002, FFTs are calculated for the IQ values and in operation 1004 known signal classification and noise detection as described herein are performed to identify known signal and noise FFTs. In operation 1006, FFTs for known signals and noise are removed using the results of operation 1004.

Before taking the group centers, two possibilities are considered—(I) all the FFTs in a group represent a single transmission, and (II) a group comprises of multiple transmissions of different types. So, in operation 1008, change point detection (CPD) is performed to detect changes in time series data. In one embodiment, a group of consecutive FFTs are input to a CPD process to determine if there is any change in the series of waveforms and find those change position if any. Based on the CPD results, the groups are divided into multiple subgroups. As a non-limiting example of a CPD process, Pruned Exact Linear Time (PELT) may be used.

In operation 1010, outliers are removed in a group to avoid a problem where the change points detected in operation 1006 do not exactly align with changes and introduced errors in a group. In one embodiment, group member $x_i$ is deemed an outlier if the distance between $x_i$ and $x_c$ (group center)$>=1.5*$standard deviation of the group. For the rest of process 1000 the outliers found in operation 1012 are ignored.

In operation 1012, shift-invariant transformation on the group members is performed to obtain a unique representation of the same signal class but shifted in frequency axis. In one embodiment, an m-SCF is computed as described herein. The group centers of the m-SCF of the group members are obtained and used in the clustering operations of process 1000.

In operation 1014, group centers are identified for each group, ignoring outliers, and in operation 1016, group centers are clustered. In one embodiment, a divisive hierarchical clustering method is used to perform clustering of operation 1012. Any suitable technique known to one of ordinary skill in the art to achieve divisive clustering may be used. In one embodiment, initially, all data points are deemed part of the same cluster. Then, the divisive-clustering process iteratively partitions the clusters until a pre-specified cluster number is achieved or some stopping criteria is met. In one embodiment, at each step, a current cluster is divided into two partitions using a based algorithm (e.g., k-means) with cluster number equal to 2. If the variances after such divisions is high relative to the variance of the original cluster, the current division is ignored and do not divide that cluster any further. In one embodiment, a variance ratio threshold may be used to compare variance of a current group to an original group.

In operation 1018, group members are assigned the same labels as the clustered group centers obtained in operation 1016.

In some cases, clustering results might not be completely accurate, so in operation 1020, outliers are detected in the clustered data (e.g., using the same approach as in operation 1008).

In operation 1022, clusters are selected to use as models for novelty detectors. In one embodiment, cluster selection includes ignoring a resultant cluster if the number of the cluster members are below some threshold. For the current work, a cluster is ignored if the estimated bandwidths of most of the member signals corresponds to <=2 FFT bins since this means the cluster likely contains just spikes that result from IQ imbalance.

In operation 1024, novel signal detectors are trained based on the selected clusters, and added to the known signal classifiers and novelty detectors of FIG. 8 and FIG. 9. In one embodiment, clustered data is treated as labeled data based on the found cluster labels and novel signal detectors are trained using supervised learning techniques described herein. In one embodiment, training data is generated by selecting known signals with a close center bandwidth as the new signals and generate custom data by adding random noises to Gaussian pulse of width equal or close to the center bandwidth. This test data is then used for the model selection for the novel signal detectors of a current cluster. For model architecture, in one embodiment, autoencoder architectures may be used as descried in this disclosure. In one embodiment, a binary cross-entropy may be used as the loss function for the unknown signals.

Some embodiments of the disclosure relate, generally, to a spectrum monitoring and analyzing system. The spectrum monitoring and analyzing system may be configured to classify surrounding wireless activities in real-time from streaming raw radio-frequency (RF) measurements, and, in some cases, produce actionable results from the classification. In one embodiment, policies for tiered access of shared spectrum may be enforced based on signal classifications. In one embodiment, transmitters that intend to transmit a wireless signal using a spectrum may determine if a nearby, higher priority transmitter is using the spectrum.

Figure 11:
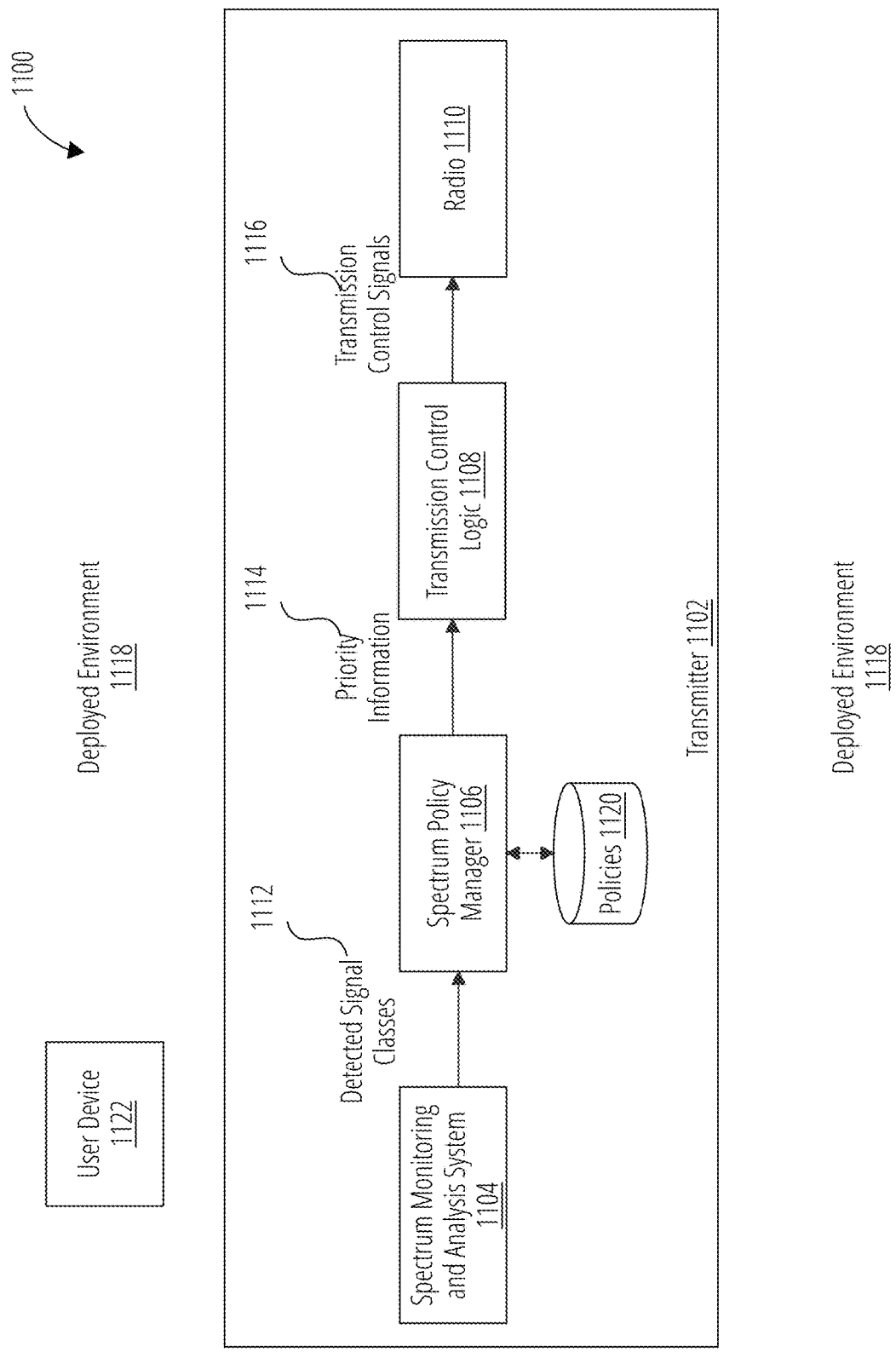
FIG. 11 illustrates a system for managing access to shared spectrum by transmitting devices in accordance with one or more embodiments.

FIG. 11 shows a functional block diagram of a system 1100 for managing access to shared spectrum by transmitting devices. In the embodiment shown in FIG. 11, transmitter 1102 is operating in deployed environment 1118, and access policies are in place for accessing shared spectrum in deployed environment 1118. At least one other transmitter is operational in deployed environment 1118, user device 1122 (user in this context meaning user of the shared spectrum).

Spectrum monitoring and analysis system 1104 is configured, generally, to sample wireless signals (i.e., gather RF measurements) present in deployed environment 1118 and classify the sampled wireless signals, as described in this disclosure. Spectrum monitoring and analysis system 1104 is configured to report detected signal classes 1112. In one embodiment, spectrum monitoring and analysis system 1104 is configured to report detected signal classes 1112 on a channel by channel basis. As a non-limiting example, spectrum monitoring and analysis system 1104 is configured to report detected signal classes 1112 grouped by channel. If there are channels for which spectrum monitoring and analysis system 1104 did not find a detected signal classes 1112, then spectrum monitoring and analysis system 1104 is configured to report that such channel is unused/available.

Spectrum policy manager 1106 is configured to manage policies 1120, analyze detected signal classes 1112 in view of policies 1120, and report priority information 1114 based on such analysis. Policies 1120 may be based, generally, on one or more shared access models for spectrum. In one embodiment, policies 1120 are based on a Spectrum Access System model, which tiers access according to categories of users: incumbents (guaranteed to have highest priority and interference-free access of the band), priority access license users (prioritized access of the band when incumbents are absent), and generalized authorized access users (no guarantee of priority or interference-free access). As non-limiting examples, categories of user may be classes of organization, such as the military and emergency services, without limitation; users may also be protocols, such as ZigBee, Bluetooth, and Wi-Fi, without limitation; and users may be classes of devices that communicate wirelessly such as handsets, automobiles, and medical devices, without limitation.

Transmission control logic 1108 is configured to control operation of radio 1110 by sending transmission control signals 1116 in response to priority information 1114 received from spectrum policy manager 1106. In one embodiment, if spectrum policy manager 1106 reports that wireless signals associated with classes having higher priority access than transmitter 1102 were detected in deployed environment 1118, then transmission control logic 1108 is configured to restrict transmitting by radio 1110. As non-limiting examples, restricting transmission may include one or more of preventing radio 1110 from transmitting until a channel becomes available, assigning a channel to radio 1110 that is not being used by a higher priority user, changing the transmission scheme used by radio 1110 (e.g., use a version of spread spectrum that will not interfere with the signals, or use a different communication protocol), and changing signal characteristics to reduce interference with other signals.

In some embodiments, spectrum monitoring and analysis system 1104 may also incorporate performance monitoring and adjustment, as described in this disclosure. Notably, such embodiments of spectrum monitoring and analysis system 1104 may be included in a variety of devices without necessarily upgrading the hardware of those devices. More specifically, since performance monitoring and adjustment techniques described herein tune classification processes to available resources, spectrum monitoring and analysis system 1104 may be incorporated in a wide variety of devices. So, policy enforcement mechanisms for access of shared spectrum may be easily incorporated into existing device architectures as well as future device architectures.

In one embodiment, system 100 may be a sub-system of a system that manages and assigns spectrum on a dynamic, as needed-basis and/or across tiers of access. A non-limiting example of larger system is a Spectrum Access System (SAS). More broadly, it should be appreciated that system 100 may be integrated into commercial shared band applications such as 3.5 GHz Citizens Broadband Radio Service (CBRS).

Many of the functional descriptions in this specification, including those with respect to FIGS. 1 to 11, may be illustrated, described or labeled as modules (also referred to herein as engines), threads, steps, operations, or other segregations of programming code, including firmware, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software or firmware, stored on a physical storage device (e.g., a computer readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are flash memory and random-access-memory (RAM). Another example of a non-transitory storage device includes a read-only memory (ROM), which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present disclosure is not so limited. Rather, many additions, deletions, and modifications to the illustrated and described embodiments may be made without departing from the scope of the present disclosure as hereinafter claimed along with their legal equivalents. In addition, features from one embodiment may be combined with features of another embodiment while still being encompassed within the scope of the present disclosure as contemplated by the inventor.

We claim:

1. A method of monitoring a wireless environment, comprising:
   monitoring a wireless environment for known signal classes;
   extracting one or more features from a signal detected in the wireless environment using one or more novelty detection models trained, at least in part, using known signals of the known signal classes;
   training one or more binary classifier models using data indicative of noise and data indicative of a signal;
   classifying the detected signal as noise or a signal using the one or more binary classifier models;
   determining that the signal is unknown responsive to the one or more features being different from features of each of the known signal classes and classifying the detected signal as a signal class;
   labeling the signal as an unknown signal responsive to the determination that the signal is unknown;
   training a learned wireless-signal classifier model using the labeled unknown signal;
   defining a new known signal class using feature representations of the learned wireless-signal classifier model; and
   adding the new known signal class to the known signal classes used for monitoring the wireless environment.

2. The method of claim 1, wherein the defining the new known signal class using feature representations of the learned wireless-signal classifier model comprises:
   defining the new known signal class using cyclostationary feature representations of the learned wireless-signal classifier.

3. The method of claim 1, wherein the defining the new known signal class using feature representations of the learned wireless-signal classifier model comprises:
   defining the new known signal class using shift-invariant feature representations of the learned wireless-signal classifier.

4. The method of claim 3, wherein the defining the new known signal class using the shift-invariant feature representations of the learned wireless-signal classifier comprises:
   defining the new known signal class using an alpha-profile derived from a Spectral Correlation Function.

5. A system, comprising:
a radio;
a processor; and
a non-transitory computer-readable memory, wherein the non-transitory computer-readable memory is configured to store:
known signal classes;
signal data for detected known signals, unknown signals, and noise; and
instructions executable by the processor, the instructions adapted to enable the processor to perform operations for claim 1.

6. A method of monitoring a wireless environment, comprising:
monitoring a wireless environment for known signal classes;
extracting one or more features from a signal detected in the wireless environment using one or more novelty detection models trained, at least in part, using known signals of the known signal classes;
determining that the detected signal is not a known signal class responsive to the one or more features being different from features of the known signal classes;
classifying the detected signal as noise or a signal using a learned binary classifier, wherein the learned binary classifier was trained using data sets comprising data indicative of noise and data indicative of a signal; and
labeling the detected signal as unknown responsive to the determination that the detected signal is not a known signal class and classifying the detected signal as a signal.

7. The method of claim 6, wherein the learned noise/signal classifier model was trained using supervising learning techniques to distinguish between noise and signals using training data comprising noise and signals for a given frequency spectrum.

8. A signal monitoring system, the system comprising:
a feature set calculator configured to generate feature sets for signals detected in a deployed environment;
classifier models configured to classify the signals detected in the deployed environment responsive to the calculated feature sets, the classifiers comprising:
a learned binary classifier model configured to classify one or more signals as a respective noise class or a signal class, the learned binary classifier model trained using data labeled as noise data and data labeled as signal data; and
learned known signal classifier models, the learned known signal classifier models configured to sort the one or more signals into respective known signal classes responsive to a determination that a feature set for each of the one or more signals corresponds to a known signal class of the known signal classes;
a result merger configured to label one or more signals as unknown responsive to the determination that a feature set of each of the one or more signals does not correspond to a known signal class of the known signal classes and classifying the one or more signals as a signal class; and
a classification engine, configured to train a new learned known signal classifier using the labeled unknown signal.

9. The system of claim 8, wherein the classification engine is configured to define a new known signal class using feature representations of the learned known signal classifier model.

10. The system of claim 8, wherein the learned signal/noise classifier model is configured to classify the unknown signal as belonging to a signal class responsive to detecting the absence of noise.

\* \* \* \* \*

UNITED STATES PATENT AND TRADEMARK OFFICE
CERTIFICATE OF CORRECTION

PATENT NO. : 12,418,349 B2  
APPLICATION NO. : 17/056359  
DATED : September 16, 2025  
INVENTOR(S) : Kurt W. Derr et al.

Page 1 of 1

It is certified that error appears in the above-identified patent and that said Letters Patent is hereby corrected as shown below:

On the Title Page  
In ITEM (71), Applicants:     Lines 3-5,     change "Salt Lake City, UT (US); Dawn Ramirez, Shelley, ID" to --Salt Lake City, UT (US)--

In the Specification

| | | |
|---|---|---|
| Column 10, | Line 45, | change "$score_{s,if} =$" to --$score_{s_1 f} =$-- |
| Column 10, | Line 45, | change "$count_{s_\lambda i}$" to --$count_{s_1 f}$-- |
| Column 12, | Line 27, | change "time to and after to it forwards" to --time $t_0$ and after $t_0$ it forwards-- |
| Column 12, | Line 50, | change "new $score_{s,f} =$" to -- new $count_{s,f} =$-- |
| Column 16, | Lines 28-29, | change "shown in FIG. 8, At block 806," to --shown in FIG. 8, at block 806,-- |

Signed and Sealed this  
Eleventh Day of November, 2025

John A. Squires  
*Director of the United States Patent and Trademark Office*